US012005672B2

(12) United States Patent
Panzeri

(10) Patent No.: US 12,005,672 B2

(45) Date of Patent: Jun. 11, 2024

(54) MACHINE AND PROCESS FOR PRODUCING BEVERAGE STIRRING SPOONS OR STICKS

(71) Applicant: QWARZO S.P.A., Rovato (IT)

(72) Inventor: Luca Panzeri, Lomagna (IT)

(73) Assignee: QWARZO S.P.A., Rovato (IT)

( * ) Notice: Subject to any disclaimer, the term of this patent is extended or adjusted under 35 U.S.C. 154(b) by 0 days.

(21) Appl. No.: 17/619,858

(22) PCT Filed: Jun. 26, 2020

(86) PCT No.: PCT/IB2020/056056

§ 371 (c)(1),
(2) Date: Dec. 16, 2021

(87) PCT Pub. No.: WO2020/261198

PCT Pub. Date: Dec. 30, 2020

(65) Prior Publication Data

US 2022/0305752 A1 Sep. 29, 2022

(30) Foreign Application Priority Data

Jun. 27, 2019 (FR) ....................................... 1907045

(51) Int. Cl.
*B31D 5/00* (2017.01)
*B31D 5/02* (2017.01)

(52) U.S. Cl.
CPC ............. *B31D 5/0091* (2013.01); *B31D 5/02* (2013.01); *B31D 2205/00* (2013.01)

(58) Field of Classification Search
CPC ..... B31D 5/0091; B31D 5/02; B31D 2205/00
(Continued)

(56) References Cited

U.S. PATENT DOCUMENTS 1,504,771 A 8/1924 Mallory
2,218,525 A 10/1940 Decker
(Continued)

FOREIGN PATENT DOCUMENTS

FR 1393377 3/1965

OTHER PUBLICATIONS

International Search Report and Written Opinion Received for the PCT Application No. PCT/IB2020/056056, dated Nov. 16, 2020, 11 pages.

(Continued)

*Primary Examiner* — Anne Marie Antonucci
*Assistant Examiner* — Luis G Del Valle
(74) *Attorney, Agent, or Firm* — Amster, Rothstein & Ebenstein LLP

(57) ABSTRACT

A machine for producing paper cutlery includes a paper feeding station; a processing station arranged to die-cut one or more sheets of paper arriving from the paper feeding station into uncoated cutlery; and a removal station that separates the uncoated cutlery from the sheets of paper. A recycling station extracts residual scrap paper generated by the processing station. The residual scrap paper was formed from the sheets of paper after the uncoated cutlery is cut and formed. The machine further includes a treatment station arranged to apply a viscous liquid material based on silicon and hydroxy groups to the uncoated cutlery to evenly coat the uncoated cutlery. The viscous liquid material is applied following removal of the residual scrap paper at the recycling station. An oven is provided to dry and crystallize the viscous liquid material on the uncoated cutlery to produce a plurality of coated cutlery.

16 Claims, 10 Drawing Sheets

(58) Field of Classification Search
USPC .......................................................... 53/376.3
See application file for complete search history.

(56) References Cited

U.S. PATENT DOCUMENTS

| | | | | |
|---|---|---|---|---|
| 3,452,650 | A * | 7/1969 | Cobb | B31D 5/0091 493/464 |
| 2004/0168695 | A1* | 9/2004 | Snaidr | A24D 1/02 131/365 |
| 2011/0117374 | A1* | 5/2011 | Cho | D21H 19/32 428/452 |
| 2013/0209702 | A1* | 8/2013 | Rothen | B05D 3/14 427/545 |
| 2022/0176598 | A1* | 6/2022 | Högblom | B26F 1/384 |

OTHER PUBLICATIONS

International Preliminary Report on Patentability Received for the PCT Application No. PCT/IB2020/056056, dated Jun. 11, 2021, 7 pages.

* cited by examiner

MACHINE AND PROCESS FOR PRODUCING BEVERAGE STIRRING SPOONS OR STICKS

CROSS REFERENCE TO RELATED APPLICATIONS

This application claims benefit under 35 U.S.C. § 371 to international application No. PCT/162020/056056 filed on Jun. 26, 2020, which claims priority to French application No. FR 1907045 filed on Jun. 27, 2019, the contents of which are incorporated by reference in their entireties.

FIELD OF THE INVENTION

The present invention relates, in general, to a machine and process for producing beverage stirring spoons or sticks.

In particular, the present invention relates to the techniques for producing stirring spoons or sticks made of paper or cardboard and coated with a layer of material. The layer of material is adapted to make the stirring spoons or sticks waterproof, to make them usable with all types of beverages, including hot beverages.

More specifically, the present invention relates to the production of paper or cardboard stirring spoons or sticks which may be distributed together with the beverages in the automatic beverage dispensing machines or which may be supplied (individually wrapped or not) in office kits together with beverage pods (coffee, tea, barley coffee, etc.), cups and sugar sachets.

Alternatively, such stirring spoons or sticks may be provided in bar or fast food chains (such as McDonald's, Starbucks, M&S).

BACKGROUND ART

Currently, stirring spoons or sticks for stirring hot beverages supplied by vending machines and provided in fast foods are made of plastic or, alternatively, of wood. The plastic sticks are highly polluting and will soon be banned from the market. Differently, wooden sticks are very expensive and being made of a porous material they create an excellent substrate for the proliferation of mold and bacteria. Wood is also a material which wears under the effect of use, and is easily etched, for example, if it is nibbled or broken, and may release splinters in the beverages.

SUMMARY OF THE INVENTION

Therefore, a machine and process for producing paper beverage stirring spoons or sticks is described in the present patent application, including embodiments which solve the aforesaid disadvantages and other limits of the currently existing solutions. In particular, the present invention relates to a machine for producing paper beverage stirring spoons or sticks, comprising:

- a paper feeding station,
- a processing station to die-cut the paper arriving from the feeding station and to make the spoons or sticks,
- a station for removing spoons or sticks, to remove and separate the spoons or sticks cut at the processing station from the scrap,
- a station for extracting the paper scrap to eliminate the residual scrap generated by the processing station,
- a treatment station, to apply a viscous liquid material based on silicon and hydroxy groups to the spoons or sticks, following the removal of the scrap, to evenly coat the spoons or sticks, and

- an oven to dry and crystallize the viscous liquid material and to make the spoons or sticks.

The present invention also relates to a corresponding process for producing paper beverage stirring spoons or sticks.

In particular, a product based on silicon oxide $SiO_2$, obtained by means of sol-gel technology, is used to coat the paper spoons or sticks.

Finally, it is possible to provide a machine and process for producing paper cutlery in which, between the treatment step and the step of drying the viscous liquid material, a forming station is interposed, in which a series of shaping molds for making spoons, forks and knives is there.

BRIEF DESCRIPTION OF THE FIGURES

Further features and advantages of the invention will become apparent from the following description provided by way of explanation and not by way of limitation, with the aid of the Figures shown in the accompanying tables, in which.

Figure 1A:
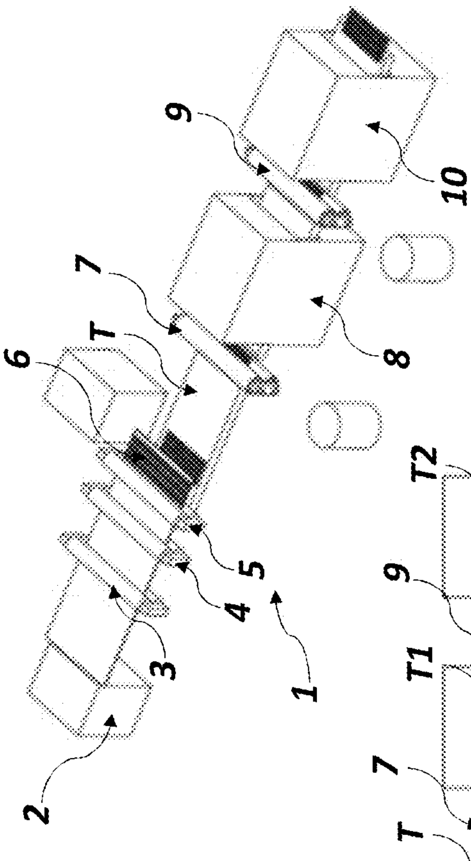
FIG. 1 shows a perspective view (a), a side view (b) and a top view (c) of an example of a machine for producing beverage spoons or sticks according to the present invention.

The parts according to the present description have been represented in the drawings, where appropriate, with conventional symbols, showing only those specific details which are pertinent to the understanding of the embodiments of the present invention, so as not to highlight details which will be immediately evident to the person skilled in the art, with reference to the description provided below.

DETAILED DESCRIPTION OF THE INVENTION

It is the object of the invention to realize paper beverage stirring spoons or sticks which, by virtue of a coating with siloxane products of sol-gel technology, is capable of giving paper spoons or sticks resistance, for example to water, hot water, alcohol and oil.

This material used for coating the paper spoons or sticks allows the plastic spoons to be completely replaced, while maintaining the recyclability of the paper and the compostability thereof.

The technology adopted starts from paper sheets which are subsequently die-cut according to the different shapes and with different die-cutting technologies (flat die, roller die, and so on).

Once the spoons or sticks are die-cut, they are treated on all sides with a product based on silicon oxide $SiO_2$ made with sol-gel technology, thanks to a system of superimposed rollers made of felt or absorbent material. In detail, the rollers are internally doused with the product to be applied on the spoons or sticks. The spoons or sticks, passing through the rollers, which adapt to the shape of the spoon or stick, are treated on all sides.

Once coated, the spoons or sticks enter a continuous belt oven, sufficiently long so as to allow the product to dry at a temperature of about 180° C.

Once the spoons or sticks have dried, they may be packed loose, wrapped in multiple packages or individually wrapped according to the type of use of the end customer.

Figure 1B:
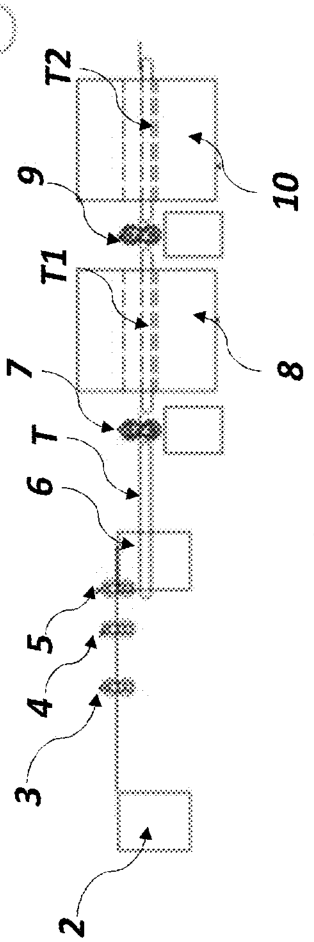
Figure 1C:
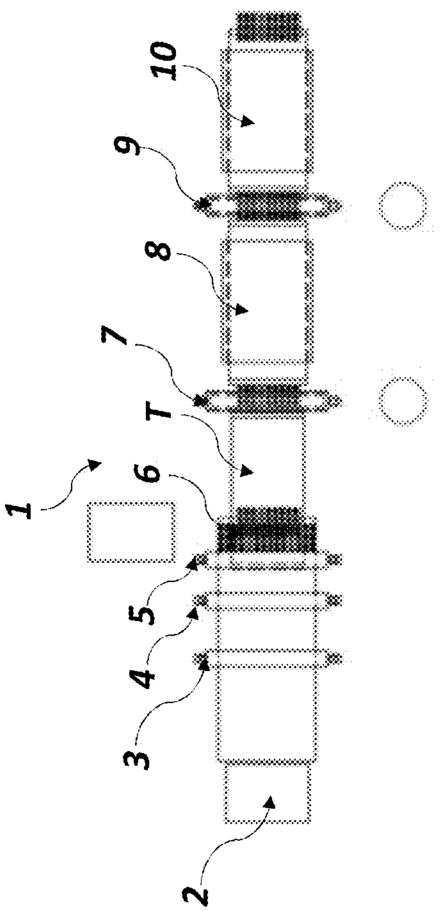

With reference to FIG. 1, reference 1 indicates as a whole a machine for producing beverage stirring spoons or sticks according to the present invention.

The machine 1 for producing beverage stirring spoons or sticks according to the present invention uses paper or cardboard sheets which have the features described below.

The paper used has a composition of 100% virgin fiber. The paper sheets used have a humidity of 7.5% (with tolerance of +/−1.5%).

The paper used to realize the spoons or sticks has a resistance of 120 J/$m^2$ per min, or 100 (Scott Bond TAPPI 569).

Conventionally, the paper used has an aqueous extract pH value of 7.

For this type of production, paper sheets are used with a thickness of 1.5 mm which corresponds to a gram mage of 760 g/$m^2$.

The paper used is certified for food use and for contact with food.

The paper used is made in the paper mill starting from natural cellulose and compacted until reaching the required thickness.

In particular, the machine 1 comprises a first station 2 for feeding and inserting the paper or cardboard sheets from which the spoons or sticks are obtained.

In particular, the first station 2, also called the sheet entry station, comprises a pneumatic system capable of taking a plurality of sheets from a pallet of sheets cut to size, and positioning it on a printing machine according to a defined direction and with established frequency.

The sheets of paper are placed on a palletized system (generally, the machine has three pallet systems so as to allow the sheets to be loaded while the machine is working) which comes into contact with a vertical push system so as to always keep the last sheet at the top of the pile and allow the last sheet to be picked up by the pneumatic system of the machine. When the last sheet of the pallet is removed, the machine automatically changes the pile of sheets previously loaded on another pallet.

The picking of the sheets on the pallet occurs by means of a series of pneumatic suckers capable of picking the whole sheet without it folding and, also by virtue of a pneumatic or mechanical detacher, it is possible to pick a single sheet at a time and then position it on a conveyor belt which carries the sheet guided into the die-cutting station.

Therefore, the paper or cardboard sheets, pre-cut in the correct size, are fed to the machine 1 which processes them in different stations placed in cascade for producing the spoons. The paper or cardboard sheets fed to the machine 1 undergo different processes in sequence which ultimately lead to the production of beverage spoons or sticks.

The paper or cardboard sheets, present in the first sheet collection station 2, are fed individually to a second processing station comprising a first rotary die 3, a second rotary die 4 and finally a rotary station for removing the spoons or sticks 5. The two rotary dies 3 and 4 are used to optimize the cutting scrap. The first die 3 cuts at double pitch and the second die 4 always cuts at double pitch, but in an offset position with respect to the first die for a flush cut between spoon and spoon.

Figure 6:
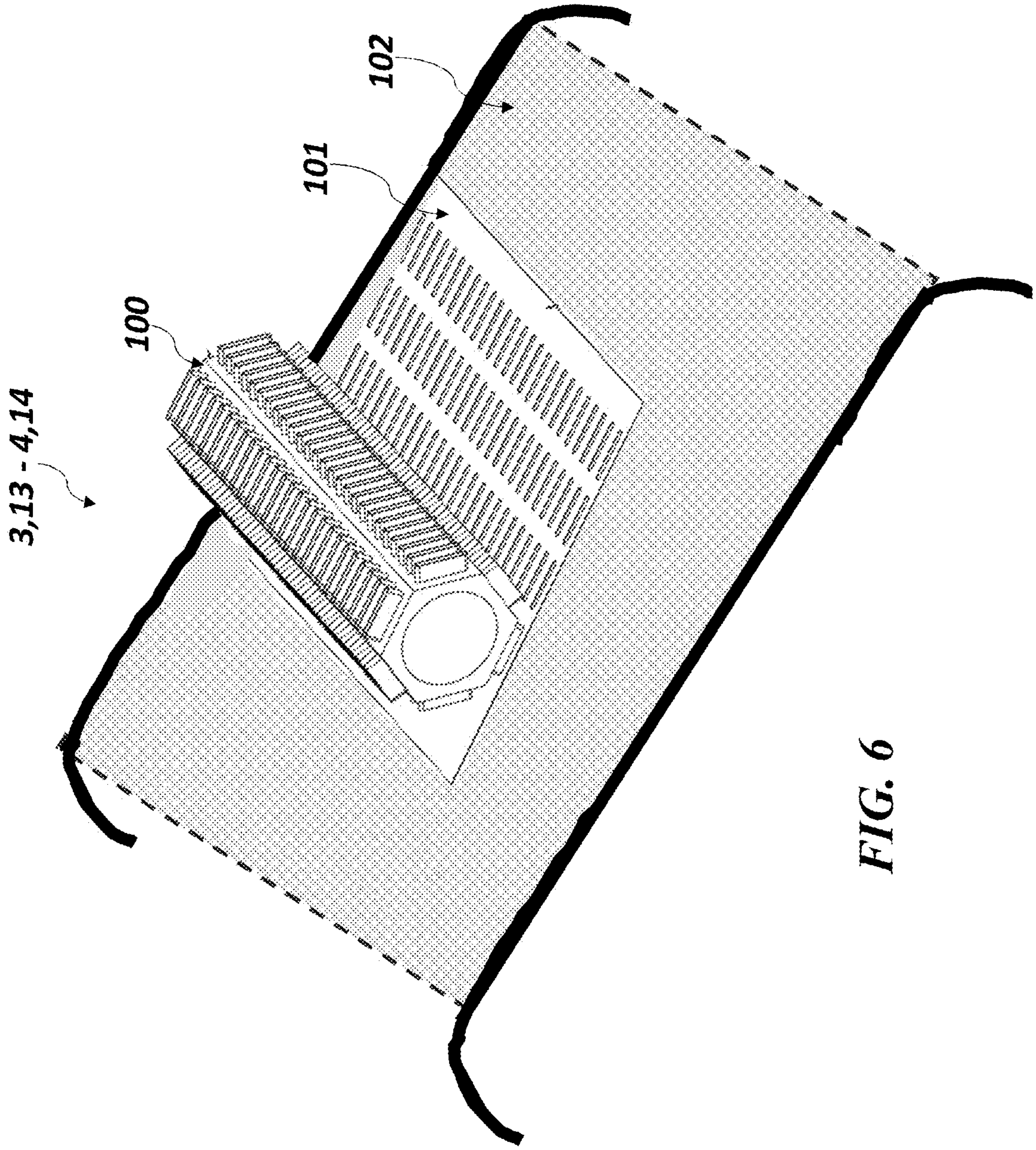
FIG. 6 is a top perspective view of a arrangement between a machined cylinder and a flat roller for cutting the beverage spoons or sticks from a sheet of paper.
Figures 7A, 7B:
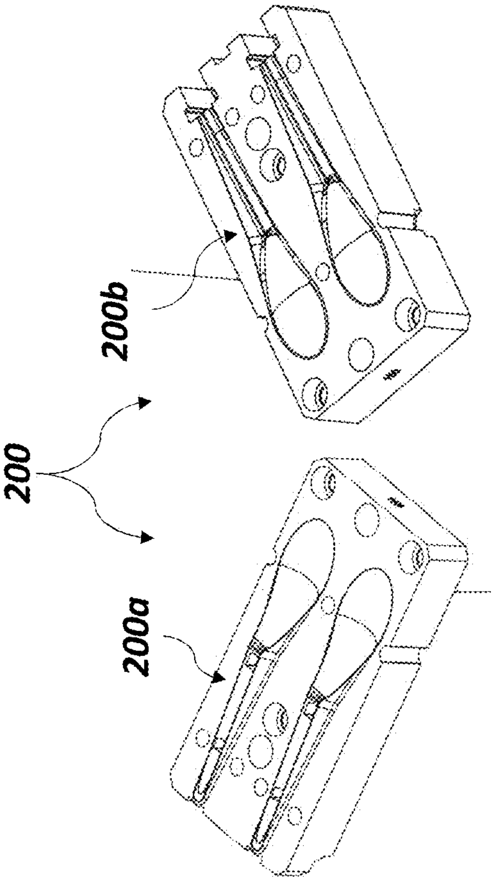
FIG. 7 depict inferior and superior top perspective views of shaping molds for forming the beverage spoons or sticks.
Figure 8B:
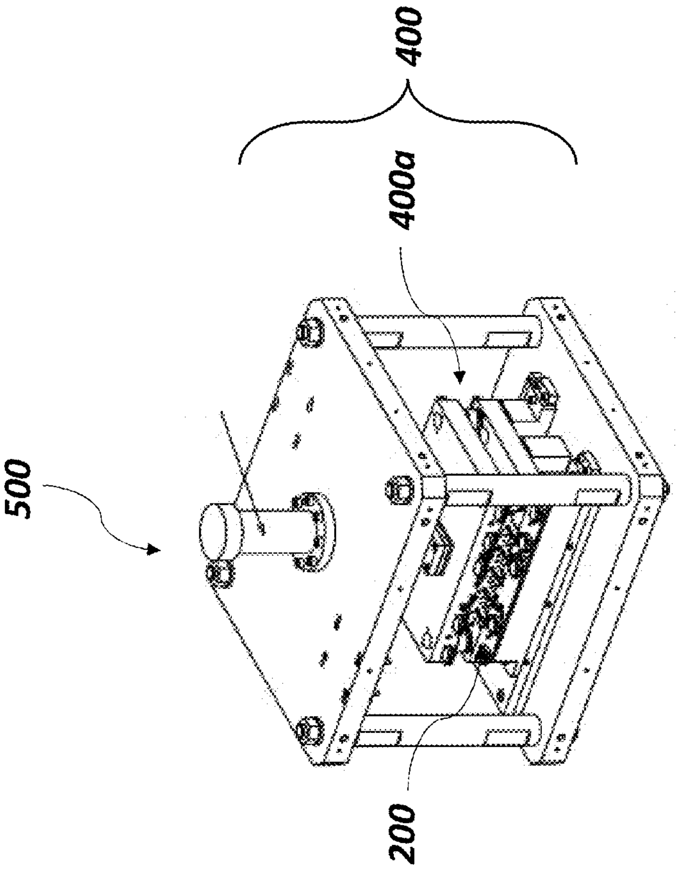
FIGS. 8A and 8B depict top perspective views of a forming station which includes a vertical press with the shaping molds of FIG. 7 in a closed state.
Figure 8A:
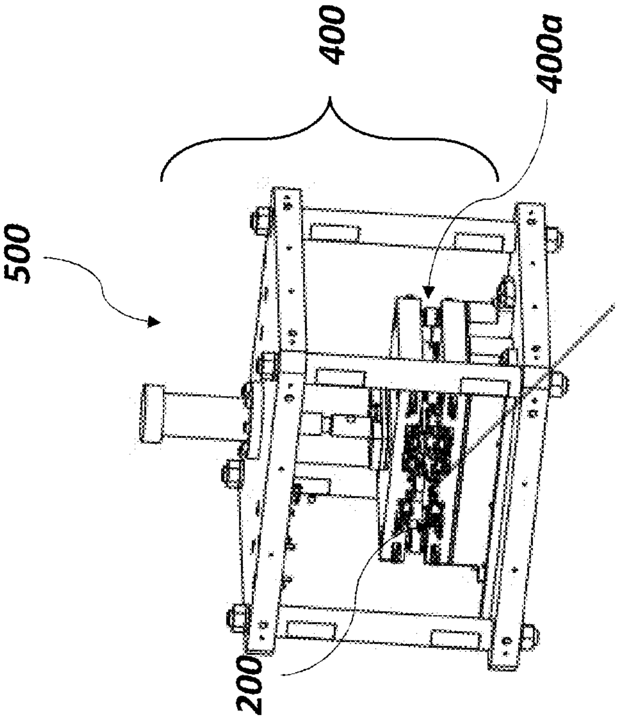
Figure 9B:
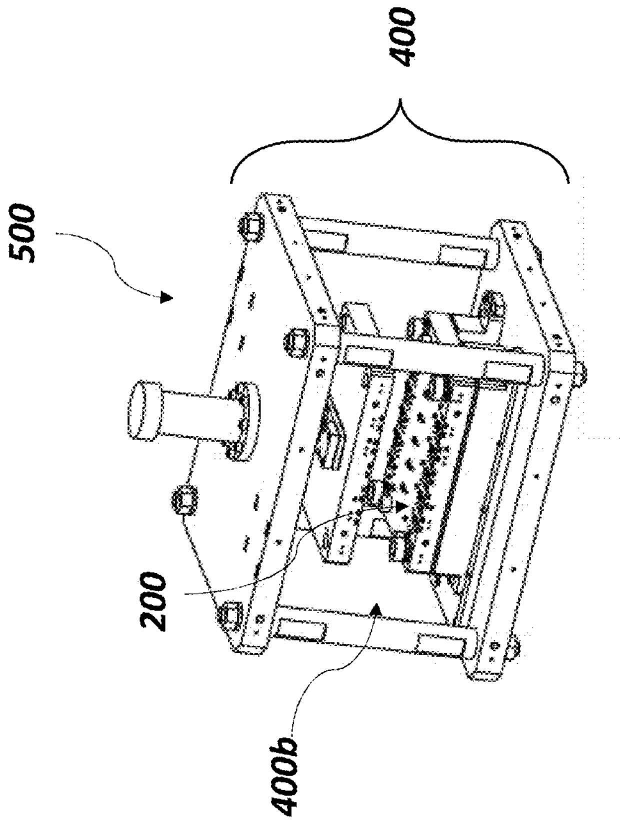
FIGS. 9A and 9B respectively depict a side elevation view and a top perspective view of a forming station which includes a vertical press with the shaping molds of FIG. 7 in an open state.
Figure 9A:
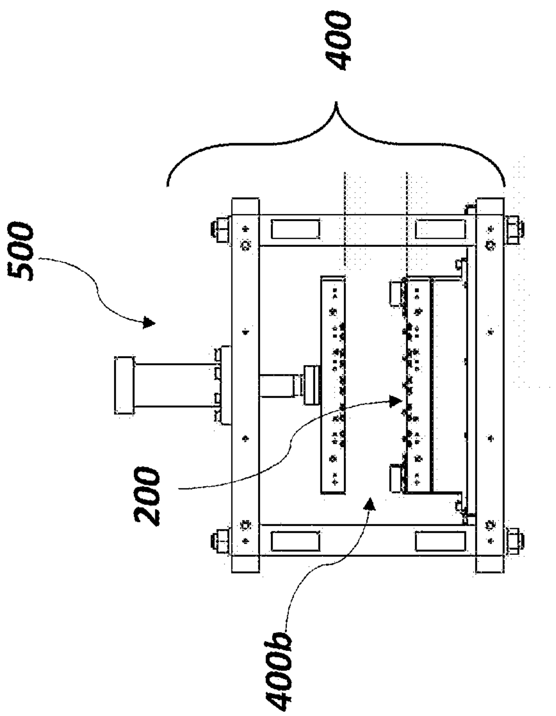

In particular, in an embodiment illustratively shown in FIG. 6, the first rotary die 3 is a cylinder suitably machined according to a defined shape, capable, by pressing against a flat roller, to die-cut the paper sheet and obtain the spoons or sticks. Furthermore, in an alternative embodiment illustratively shown in FIGS. 8A to 10 of the drawings, it is possible to replace the first rotary die 3 with a conventional flat die 200 made with a suitably folded steel sheet, which, mounted on a vertical press 400 at a forming station 500, cuts the spoons or sticks from the paper or cardboard sheet which is fed into this processing station of the machine 1. Referring to FIGS. 7A, a top perspective view of an inferior shaping mold 200*a* to form a spoon is illustratively shown. FIG. 7B illustrates the opposing superior shaping mold 200*b* of the shaping molds 200 to form the spoons. FIGS. 8A and 8B illustrate the vertical press 400 in a closed state and FIGS. 9A and 9B illustrate the vertical press 400 in an open state.

Figure 3:
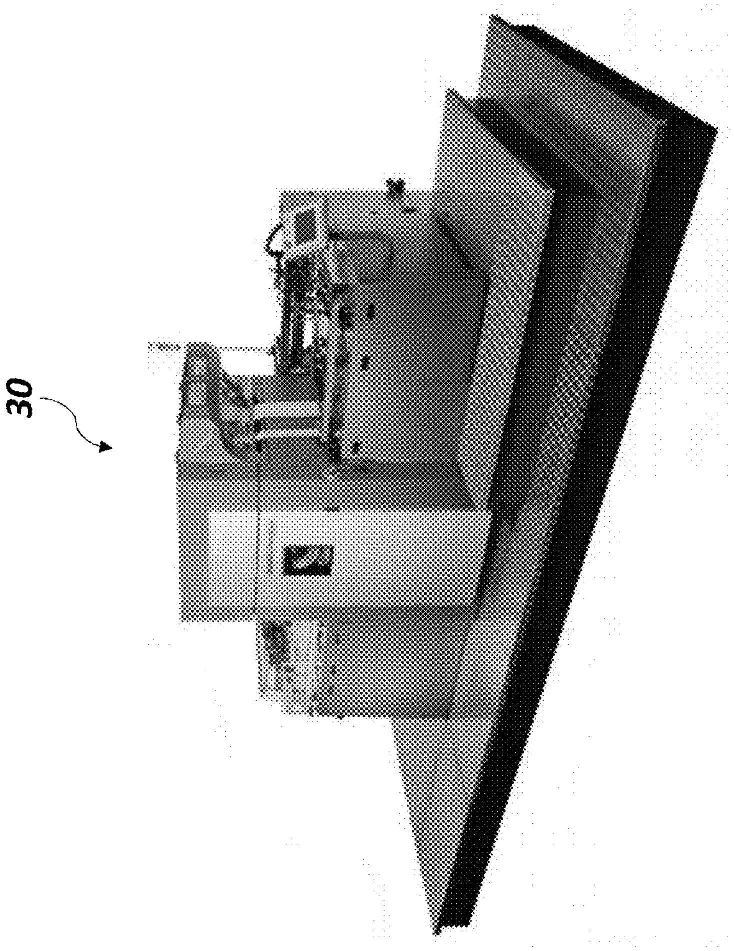
FIG. 3 shows a variant of the first part of the machine for producing beverage spoons or sticks according to the present invention.
Figure 4:
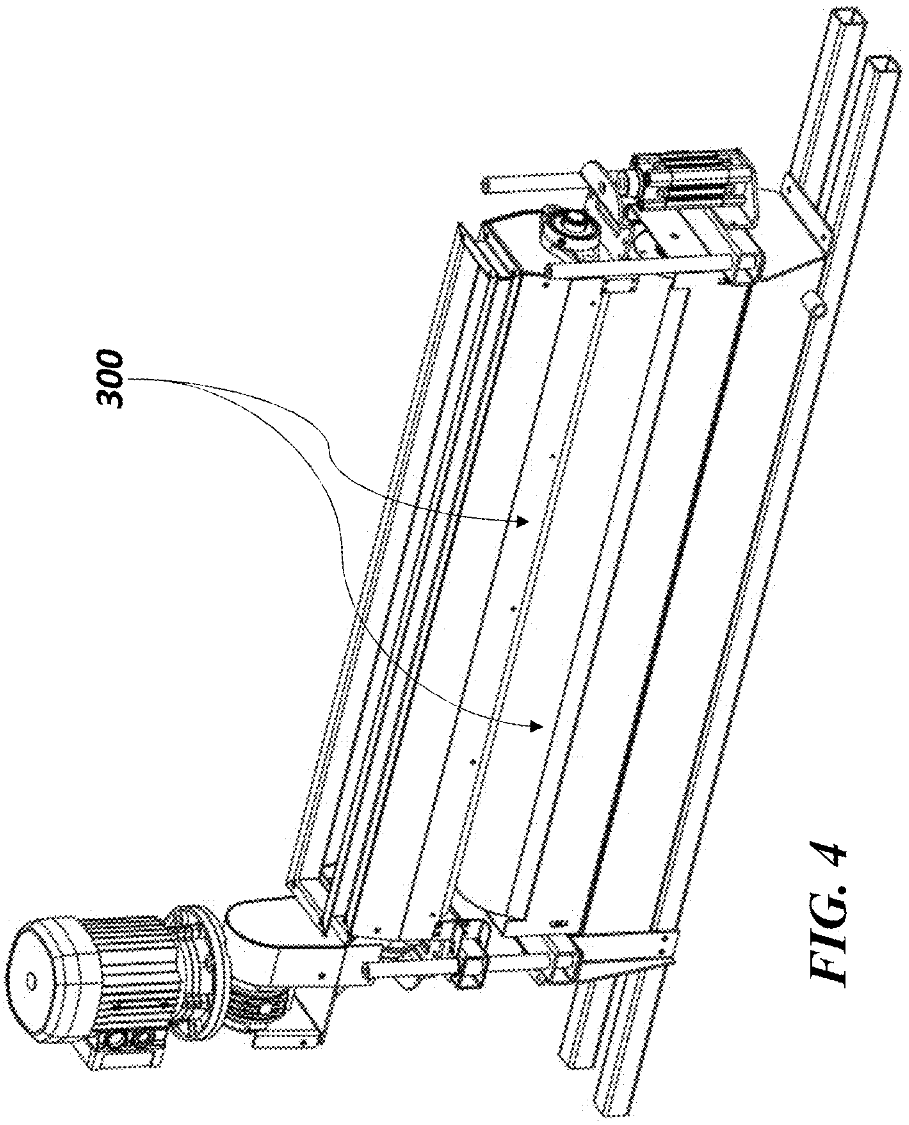
FIG. 4 is a top, side view of a set of counterposed motorized rollers suitable for applying a coating to the beverage spoons or sticks.
Figure 5C:
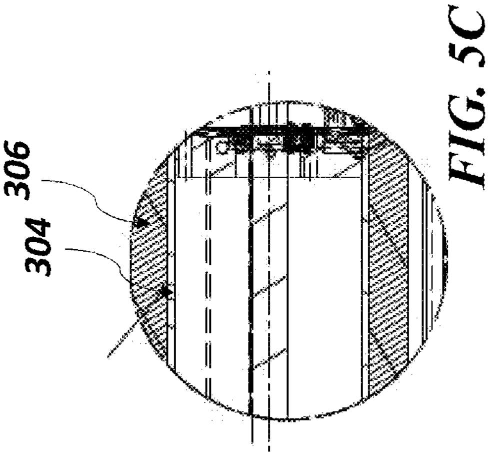
FIGS. 5A, 5B and 5C are respectively a side elevation view, partial enlarged view and top plan view of the counterposed motorized rollers of FIG. 4.
Figure 5A:
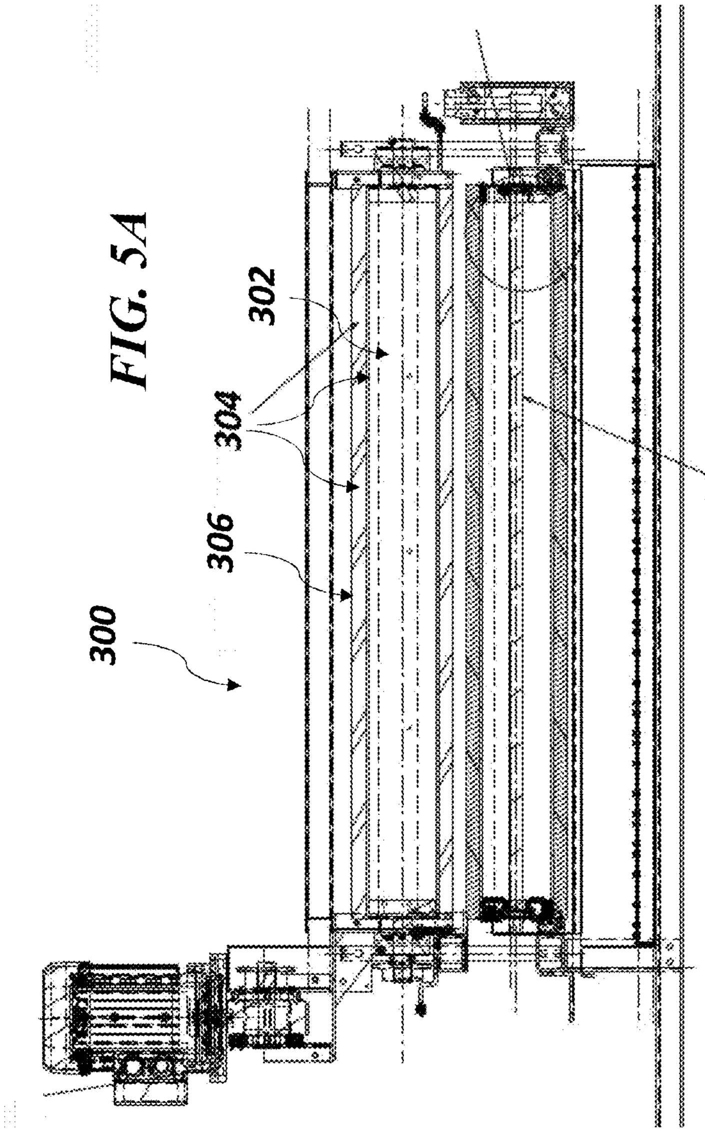
Figure 5B:
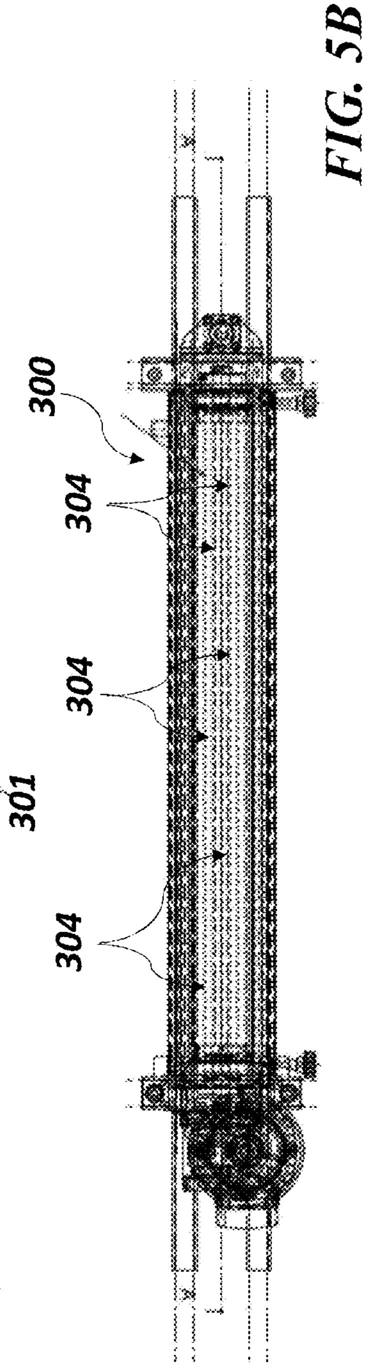

In a further embodiment it is possible to include a die-cutting machine 30 (see FIG. 3) upstream of the station 6. With the current machines it is possible to flat die-cut with a flush cutting between spoon and spoon, optimizing both the scrap and the speeds (6000 72×76 cm sheets per hour).

With this technique, the three stations 3, 4 and 5 with the rollers would be eliminated and replaced with an automatic machine, while instead, for the treatment part, everything would remain the same.

Downstream of the rotary station 5 for removing the spoons, a sheet residue extraction station 6 is there, which removes the scrap from the processed paper or cardboard sheets.

In particular, following the operation for removing the spoons or sticks in the station 5, both if the die is rotary or flat, it is necessary to insert a pneumatic system capable of removing the scrap of the die-cut sheets.

Therefore, once the spoons or sticks are removed in the station 5, in the sheet residue extraction station 6, the processing scrap and the edges are eliminated, leaving the paper or cardboard spoons or sticks on the conveyor belt.

The scrap is removed from the machine by means of a mechanical gripper system which takes the scrap on the edge and piles it out of the machine with a combined pneumatic-mechanical system.

The scrap, being pure virgin paper, may be entirely recycled and is generally collected by the same paper supplier to undergo a treatment for the generation of other paper sheets.

The work surface only changes following the die-cutting step to recover the spoons or sticks under the die surface. This allows to collect the spoons or sticks under the die plane and to move the scrap of the die-cut sheet from the treatment line. Following the paper or cardboard sheet residue extraction station 6, a conveyor belt T is there, which transports the spoons or sticks thus obtained to a treatment station 7.

The paper or cardboard spoons or sticks reach the treatment station 7 and are impregnated with a viscous liquid based on silicon and hydroxy groups which will be described below in the following description.

The spoons travel on a conveyor belts with a perforated belt. The product does not drip and does not stick to the belt.

Such viscous liquid is used to coat the paper or cardboard spoons and make them waterproof and usable even with hot beverages. In particular, once dried and crystallized, the viscous liquid creates a coating layer on the paper or cardboard, and, more in detail, it impregnates the paper or cardboard fibers so as to become completely adherent thereto. The viscous material is used to give a greater consistency to the paper spoons or sticks.

In particular and referring to FIGS. 4 and 5A-5C, the treatment station 7 comprises two motorized rollers 300 made of felt and counterposed to each other. The two rollers made of felt, or of another similar absorbent material 306, have a particular structure which allows to totally impregnate the spoons in a single pass, and, for example, comprise fibers protruding with respect to the base of the roller.

The felt rollers are made based on polyester and with a density of about 80 $kg/m^3$. The two motorized rollers 300 have a hollow tube therein, preferably made of iron. By means of a pressure system, the viscous liquid is inserted inside the hollow tube 302 contained in the roller from a viscous liquid dispenser 301. The hollow tube inside the roller has holes 304 on the side walls thereof and allows to transfer the viscous liquid product to the felt roller.

Therefore, by virtue of the conformation thereof, the felt rollers, thus impregnated with viscous liquid, are capable of simultaneously treating all six surfaces of the die-cut object, i.e., of the spoons.

The system may be adjusted with various parameters such as:

- pressure of the viscous liquid which is inserted into the hollow tube inside the felt roller,
- frequency with which the viscous liquid is inserted into the hollow tube,
- rollers rotation speed, and
- pressure exerted between the two rollers.

At the end of the passage of the spoons through the roller treatment station 7, the spoons are fed through another conveyor belt T1 to a first oven 8 which is used to dry and crystallize the viscous liquid product spread with the treatment rollers 7. In particular, the oven 8 dries the layer of viscous liquid material with a hot air or infrared system at a temperature of about 180° C. This step allows the viscous liquid material coating applied to the paper or cardboard spoons to solidify.

The oven 8 has a perforated glass fiber belt capable of passing hot air even on the surface of the spoons resting on the belt. In any case, the temperature which reaches the entire cardboard spoon is sufficient to polymerize the product. The arrangement of the spoons inside the oven may be random and even with small overlaps, since this does not affect the drying of the product.

Obviously, oven 8 may be made with any known technique and has the purpose of drying the viscous liquid spread by the rollers on the paper or cardboard spoons to give a greater consistency to the paper or cardboard spoons.

At the end of such drying operation, the coated spoons may be removed to be packaged or may undergo a second processing step which includes a second treatment station 9 and a second drying oven 10.

The double passage through oven 8 and oven 10 is provided only as an additional safety measure to ensure the treatment of the spoon, but it is not essential or necessary.

Upon leaving the station 9, comprising the second treatment roller, the spoons are received on a third conveyor belt T2 which feeds the spoons to the drying oven 10.

Therefore, at the end of the processing, the paper or cardboard spoons or sticks are completely coated with a layer of adherent material which, once dried or vitrified, gives the spoons a greater consistency, making them waterproof and suitable for the contact with beverages, even hot beverages. In particular, the viscous liquid material used has features such that the paper or cardboard spoons coated with such material are suitable for contact with food.

Furthermore, the viscous liquid material applied to the paper or cardboard during the treatment with the rollers in the station 7 allows to ensure that the coating layer of the paper or cardboard is completely adherent to the paper or cardboard fibers without danger of detaching therefrom.

The machine 1 described is capable of producing the spoons at a speed of about 30 m/min.

Figure 2A:
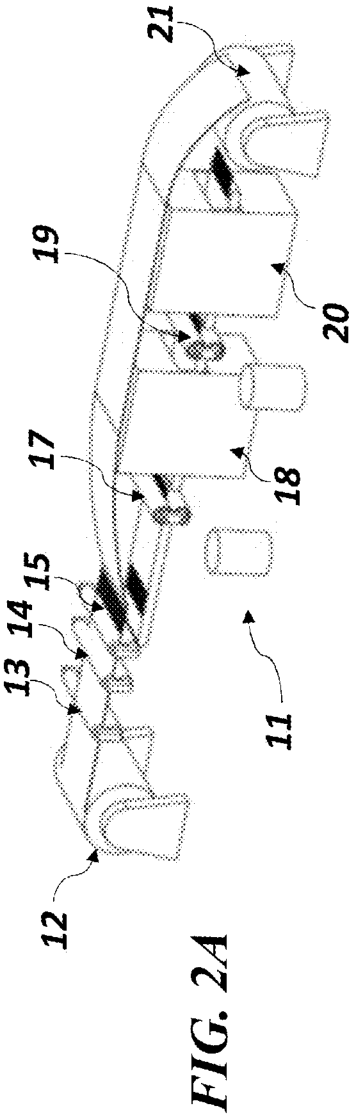
FIG. 2 shows a perspective view (a), a side view (b) and a top view (c) of a variant of the machine for producing beverage spoons or sticks according to the present invention.
Figure 2B:
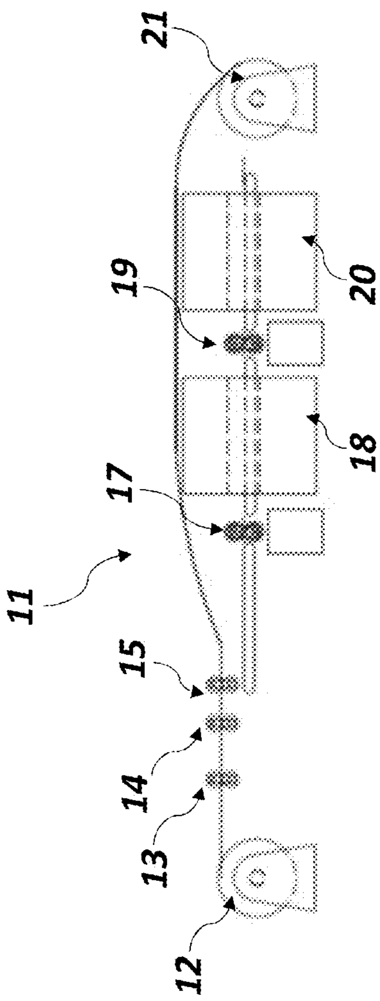
Figure 2C:
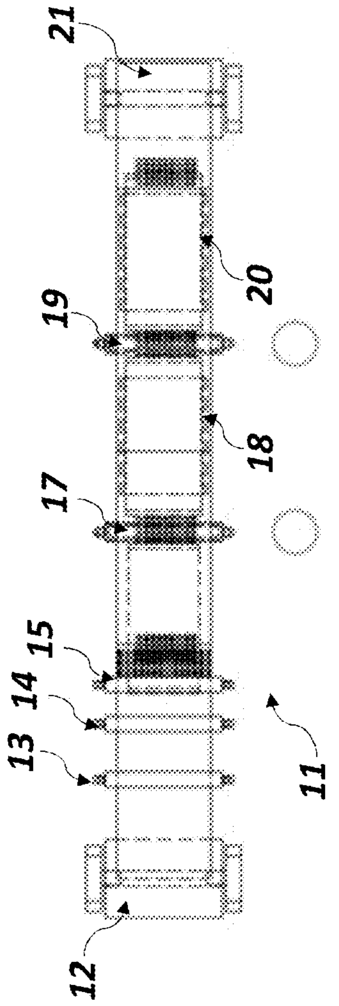

With reference to FIG. 2, an alternative embodiment of the machine for producing beverage spoons according to the present invention is now described.

In particular, in this embodiment, the machine, indicated as a whole with reference 11, is continuously fed by paper or cardboard reels which replace the single pre-cut sheets of the machine 1.

In this case, the first feeding station 12 comprises a roller adapted to carry the paper or cardboard reel.

The paper or cardboard reel is unrolled and fed to a group of processing rollers 13, 14, 15 which carry out the processings which, in the machine of FIG. 1, were carried out by the first rotary die 3, the second rotary die 4 and the rotary station for removing the spoons 5.

The processing rollers 13, 14 (like the rollers 3 and 4) may also carry out different operations in addition to die-cutting. For example, they may imprint a mark on the spoon or die-cut a particular logo which may not be made during the die-cutting step of the spoon.

In this case, downstream of the station for removing the spoons 15, the edges and the part of paper or cardboard scrap are transported over the machine 11 and is collected on a reel 21.

The paper or cardboard spoons exiting the station 15 are fed on a conveyor belt to the treatment station 17 similar to the roller treatment station 7 of the machine 1. At the end of the processing performed in the roller treatment station 17, the paper and cardboard spoons coated with a layer of viscous liquid material reach a first oven 18 on a belt where the viscous liquid material spread on the paper or cardboard spoons is dried.

Subsequently, the spoons coated with a first layer may be removed to be packaged or they may be coated with a second layer of viscous liquid by passing through a second treatment station 19. In the second case, there will also be a second drying inside a second oven 20.

The viscous liquid which is used to coat the paper or cardboard spoons will now be described.

As already indicated, the viscous liquid used is based on silicon and hydroxy groups. In the background art, this material is known as sol-gel.

The sol-gel material used in the machine according to the present invention may be obtained according to the following process.

The process is adapted for the production of the sol-gel to be used as a viscous liquid material to coat the paper or cardboard spoons.

The process comprises:

preparing an aqueous or hydroalcoholic solution containing at least one compound selected from colloidal silica and an alkoxysilane, said solution having a pH not higher than 4;

distributing the sol-gel thus obtained onto the surface of the paper or cardboard;

allowing the sol-gel to gelify thus obtaining a hydrogel;

drying the hydrogel to obtain a dry gel.

When silica is used as the starting compound, this is preferably pyrogenic silica. If an alkoxysilane, alone or mixed with silica, is used as the starting compound, this is preferably a tetraalkoxysilane in which each alkoxy group has from 1 to 6, preferably from 1 to 4, carbon atoms; more preferably, the tetraalkoxysilane is selected from tetraethoxysilane (TEOS) and tetramethoxysilane (TMOS).

When the solution is produced, the pH thereof must not be higher than 4 and is preferably between 1.5 and 3.0, more preferably, between 2.0 and 2.5; to achieve this object, an acid is added to the solution, for example, an inorganic acid, such as hydrochloric acid, phosphoric acid, sulfuric acid, or an organic acid, such as acetic acid.

The preparation is generally carried out by adding the silica or alkoxysilane or a mixture thereof to the aqueous or hydroalcoholic medium and dispersing them by mechanical stirring.

Gelation is obtained by increasing the temperature.

Once the gelation is obtained, the hydrogel is dried to remove the water present inside the structure of the gel, coming from the initial solution or from the condensation reactions which led to the formation of the gel itself. The drying is carried out by introducing the hydrogel into an oven.

Of course, the machine for producing beverage spoons may also be used for producing other paper or cardboard cutlery coated with sol-gel, such as, for example, knives, forks, tablespoons, ice cream spoons, and so on.

Such cutlery may be produced in the same manner, by inserting, however, a forming station before the oven.

The cutlery die-cut by means of the preceding methods are stacked under the die part and perfectly aligned on a belt, spaced in both directions of the plane until arranging the maximum number of pieces possible on the belt dimensions, based on the shape of the die-cut object.

The cutlery thus aligned enters the treatment roller which, while treating it, does not change the alignment thereof.

Figure 10:
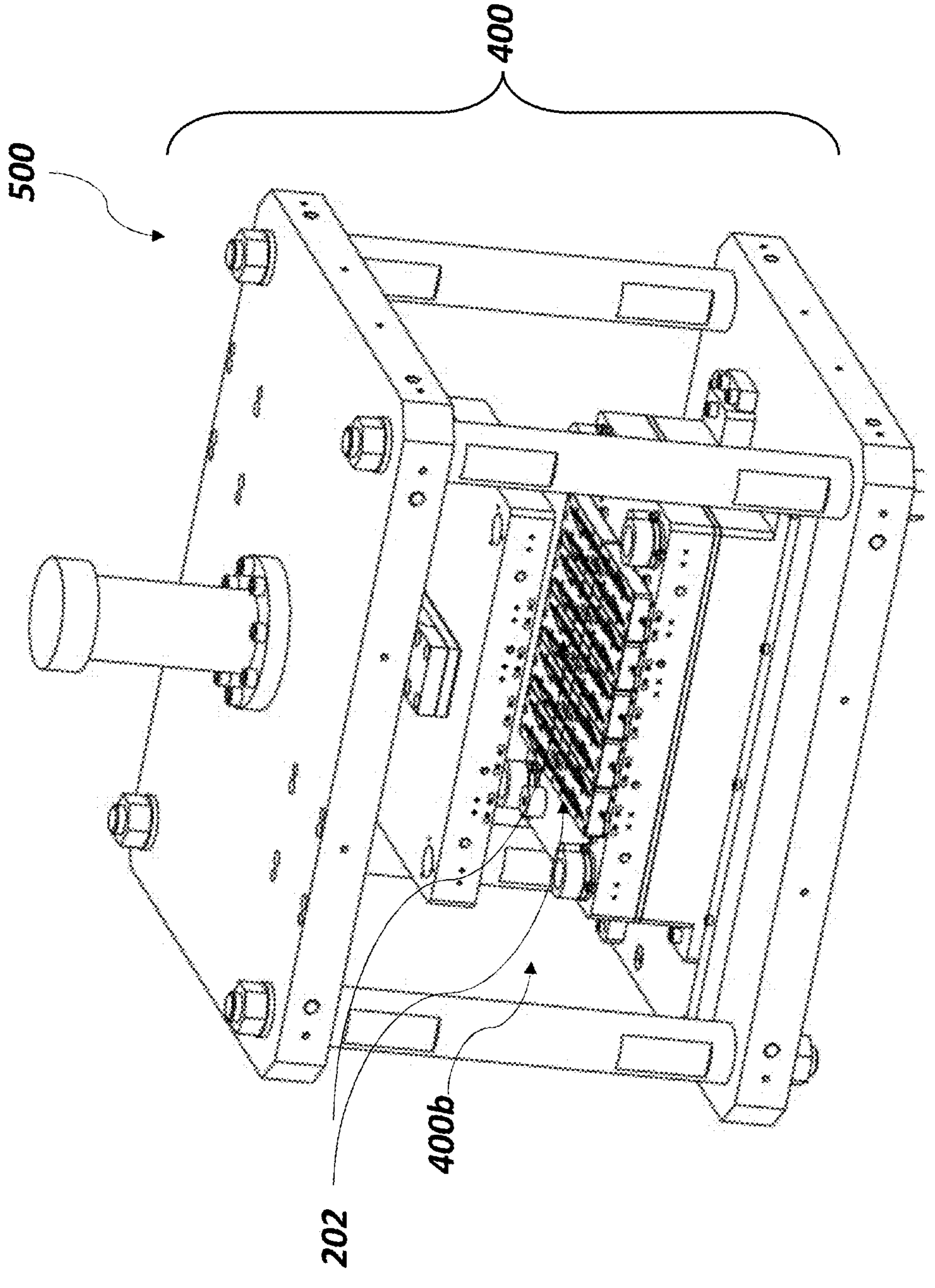
FIG. 10 is an enlarged top perspective view of the forming station of FIG. 9B having a series of shaping molds mounted in the vertical press.

Once treated, they are moved to a conveyor belt, picked with a "pick and place" system and positioned on a series of shaping molds 202, according to the shape to be given to the cutlery (fork, spoon, etc.), which close by pressure (closing force about 40 ton) the die-cut cutlery. Referring to FIG. 10, the formation station 500 includes the vertical press 400 in an open state 400*b* to illustrate the series of shaping molds 202.

The molds are heated to a temperature of about 200° C.

Once the cutlery is formed, they enter an oven to complete the drying. A "pick and place" system is still there, to remove the cutlery from the molds and place them on the oven belt.

Of course, without prejudice to the principle of the invention, the construction details and the embodiments may widely vary with respect to what is described and shown purely by way of explanation, without thereby departing from the scope of the present invention.

The invention claimed is:

1. A machine for producing paper beverage stirring spoons or sticks, comprising:

a paper feeding station;

a processing station arranged to die-cut one or more sheets of paper arriving from the paper feeding station into uncoated spoons or sticks;

a removal station for removing and separating the uncoated spoons or sticks which were cut and formed at the processing station from the one or more sheets of paper;

a recycling station for extracting residual scrap paper generated by the processing station, said residual scrap paper being formed from the one or more sheets of paper after the uncoated spoons or sticks are cut and formed;

wherein the machine further comprises:

a treatment station arranged to apply a viscous liquid material based on silicon and hydroxy groups to the uncoated spoons or sticks to evenly coat the uncoated spoons or sticks, said viscous liquid material being applied following removal of the residual scrap paper at the recycling station; and an oven arranged to dry and crystallize the viscous liquid material on the uncoated spoons or sticks to produce a plurality of coated spoons or sticks.

2. The machine according to claim 1, wherein said paper feeding station includes a single sheet feeding or a continuous feeding by a paper reel.

3. The machine according to claim 1, wherein said processing station comprises two dies which cut at a double pitch, wherein a second die of the two dies is in an offset position compared to a first die of the two dies to provide a flush cut between the uncoated spoons or sticks.

4. The machine according to claim 3, wherein the first die is a rotary die comprising a machined cylinder capable, by pressing against an opposing flat roller, of die-cutting the paper and forming the uncoated spoons or sticks.

5. The machine according to claim 3, wherein the first die is a conventional flat die fabricated from a folded steel sheet which, when operably mounted in a vertical press, shears the uncoated spoons or sticks.

6. The machine according to claim 3, wherein said processing station comprises a die-cutting machine.

7. The machine according to claim 1, wherein said treatment station comprises two counterposed motorized rollers which are made of an absorbent material to completely impregnate the uncoated spoons or sticks in a single pass.

8. The machine according to claim 7, wherein the two counterposed motorized rollers each have a hollow tube extending therein, each hollow tube dimensioned to receive the viscous liquid material, and wherein each said hollow tube is perforated to enable flow of the viscous liquid material to the absorbent material of the two counterposed motorized rollers.

9. The machine according to claim 1, wherein a sol-gel technology material is applied at said treatment station to uniformly coat the uncoated spoons or sticks.

10. The machine according to claim 1, wherein downstream of said treatment station and of said oven, a second treatment station and a second oven are provided for further drying the viscous liquid material.

11. The machine according to claim 1, wherein between said treatment station and said oven, a forming station is interposed for producing paper cutlery in which a series of shaping molds is present.

12. A process for producing paper beverage stirring spoons or sticks using the machine of claim 1, the process comprising the steps of:

feeding paper at the paper feeding station, processing, at the processing station, the paper fed to die-cut and make the spoons or sticks, removing and separating, at the removal station, the spoons or sticks from the processing scrap, extracting, at the extraction station, the paper scrap remaining from the processing step, wherein the process further comprises the steps of:

treating, at the treatment station, the spoons or sticks by applying a viscous liquid material based on silicon and hydroxy groups, following the removal of the scrap, to evenly coat the spoons or sticks, and drying the spoons or sticks in the oven to crystalize the viscous liquid material and realize the spoons or sticks.

13. The process according to claim 12, wherein the treating step further comprises applying a product based on silicon oxide ($SiO_2$), obtained by sol-gel technology, in the treatment of the spoons or sticks.

14. The process according to claim 12, wherein between said treatment step and said drying step the method further comprises providing a forming station for producing paper cutlery in which a series of shaping molds is present.

15. The machine according to claim 1, wherein the viscous liquid material, which is applied to the uncoated spoons or sticks and is based on the silicon and hydroxy groups, comprises an aqueous or hydroalcoholic solution containing at least one compound selected from colloidal silica and an alkoxysilane.

16. The machine according to claim 15, wherein the aqueous or hydroalcoholic solution has a pH less than or equal to 4.

* * * * *